(12) United States Patent  
Borowski

(10) Patent No.: US 7,413,196 B2
(45) Date of Patent: Aug. 19, 2008

(54) STABILIZER ASSEMBLY UNIT

(75) Inventor: Axel Borowski, Hückelhoven (DE)

(73) Assignee: TRW Automotive GmbH (DE)

( * ) Notice: Subject to any disclaimer, the term of this patent is extended or adjusted under 35 U.S.C. 154(b) by 181 days.

(21) Appl. No.: 11/208,447

(22) Filed: Aug. 19, 2005

(65) Prior Publication Data

US 2006/0040778 A1 Feb. 23, 2006

Related U.S. Application Data

(63) Continuation of application No. PCT/EP2004/001867, filed on Feb. 25, 2004.

(30) Foreign Application Priority Data

Feb. 26, 2003 (DE) .............. 203 03 107 U

(51) Int. Cl.
  *H02P 5/46* (2006.01)
(52) U.S. Cl. .............. 280/5.511; 280/124.106; 280/124.107; 280/124.149; 280/124.152
(58) Field of Classification Search .............. 280/5.511, 280/124.106, 124.125, 5.508, 124.107; 318/52, 318/807, 71; 267/188
  See application file for complete search history.

(56) References Cited

U.S. PATENT DOCUMENTS 4,041,361 A * 8/1977 Cornell .................. 318/802
4,825,131 A * 4/1989 Nozaki et al. ............. 318/52
5,371,446 A * 12/1994 Imaseki .................. 318/52
5,529,324 A * 6/1996 Krawczyk et al. ..... 280/124.106
6,022,030 A * 2/2000 Fehring ................ 280/5.511
6,425,585 B1 * 7/2002 Schuelke et al. ........ 280/5.511
6,550,788 B2 * 4/2003 Schmidt et al. ......... 280/5.511
6,805,361 B2 * 10/2004 Germano et al. ........ 280/5.511
7,129,659 B2 * 10/2006 Buma et al. .............. 318/432
2002/0180167 A1 12/2002 Schmidt et al.

FOREIGN PATENT DOCUMENTS

| DE | 44 43 809 | 4/1996 |
| DE | 195 34 788 | 12/1996 |
| DE | 198 46 275 | 12/1999 |
| DE | 100 01 087 | 7/2001 |

* cited by examiner

Primary Examiner—Christopher Ellis
Assistant Examiner—Cynthia F Collado
(74) Attorney, Agent, or Firm—MacMillan, Sobanski & Todd, LLC

(57) ABSTRACT

A stabilizer assembly unit having a first stabilizer and a sun gearwheel connected non-rotatably to one end of the stabilizer includes at least one rotary drive acting on a planetary gearwheel which meshes with the sun gearwheel. For a vehicle axle having at least two wheels, a separate stabilizer assembly unit according to any of the preceding claims may be provided for each of the wheels. In a chassis assembly unit for a vehicle having a body and a stabilizer assembly unit, the internally geared wheel is connected non-rotatably to the vehicle body.

8 Claims, 6 Drawing Sheets

STABILIZER ASSEMBLY UNIT

CROSS-REFERENCE TO RELATED APPLICATIONS

This application is a continuation of International Application No. PCT/EP2004/001867 filed Feb. 25, 2004, the disclosures of which are incorporated herein by reference, and which claimed priority to German Patent Application No. 203 03 107.5 filed Feb. 26, 2003, the disclosures of which are incorporated herein by reference.

BACKGROUND OF THE INVENTION

The invention relates to a stabilizer assembly unit for a vehicle as well as a chassis assembly unit and a vehicle axle comprising such a stabilizer assembly unit.

It is known, for the implementation of an active chassis for a vehicle, for example for the implementation of a roll stabilization, to provide a stabilizer assembly unit in which the stabilizer can be pretensioned actively by an actuator, for instance to balance the roll tilt of the vehicle when cornering. One example is known from DE 44 43 809 A1, in which stabilizers are provided for the left and right axle half of a rear axle, which stabilizers can be rotated with respect to one another and thus pretensioned by means of a hydraulic rotary drive.

BRIEF SUMMARY OF THE INVENTION

The invention provides a stabilizer assembly unit comprising a stabilizer, a sun gearwheel connected non-rotatably to one end of the stabilizer, and at least one rotary drive acting on a planetary gearwheel meshing with the sun gearwheel. By selecting the ratio of transmission of the gearwheels the torque for the tensioning of the stabilizer can be adapted to the vehicle-specific requirements, so that the assembly unit can be used in various vehicles without considerable changes in the drives. The dynamics of the prestressing can be adapted to the requirements as well by dimensioning the transmission.

According to a preferred embodiment of the invention, several rotary drives are provided, each of which acts on a planetary gearwheel, the planetary gearwheels being arranged symmetrically relative to the axis of the sun gearwheel. The symmetrical arrangement of the planetary gearwheels ensures a well-balanced force transmission to the stabilizer so that the mounting of the stabilizer does not have to take up any lateral forces.

According to an advantageous embodiment of the invention it is provided that the rotary drives are connected non-rotatably to a second stabilizer. This means that the rotary drives are supported on the second stabilizer, so that the torque made available by the drive on the driven shaft refers to the second stabilizer. Thus, the assembly unit corresponds to a divided stabilizer, whose stabilizer halves can be tensioned with respect to one another by the rotary drives in a simple manner. The invention also offers the possibility to block the drives so as to couple the two stabilizers rigidly with each other, for example in case of a failure of the control or in case of corresponding driving conditions. In this case the assembly unit behaves like a conventional rigid anti-sway bar.

According to an advantageous embodiment of the invention an internally geared wheel is provided meshing with the planetary gearwheels via at least one supplementary gearwheel. The internally geared wheel ensures a more efficient force transmission from the planetary wheels.

According to a second aspect, the invention provides a vehicle axle comprising at least two wheels, and in which for each of the wheels a separate stabilizer assembly unit is provided. Thus, the prestressing of the stabilizer can be adjusted independently for each wheel. In this manner, also the pitch behavior of the vehicle, for instance when braking or when starting, can be influenced upon a corresponding control of the drives. The stabilizer can also act advantageously as a torsion bar which can be used as a support of the conventional wheel spring system with each wheel.

According to a further aspect the invention provides a chassis assembly unit for a vehicle, comprising a body and a stabilizer assembly unit having an internally geared wheel meshing with the planetary gearwheels via at least one supplementary gearwheel, the internally geared wheel being connected non-rotatably to the vehicle body. On account of the vehicle-fixed support there results advantageously a uniform distribution of the prestressing to both stabilizers, in particular in connection with a second stabilizer which is non-rotatably connected to the drives.

Other advantages of this invention will become apparent to those skilled in the art from the following detailed description of the preferred embodiment, when read in light of the accompanying drawings.

DETAILED DESCRIPTION OF THE INVENTION

Figure 1:
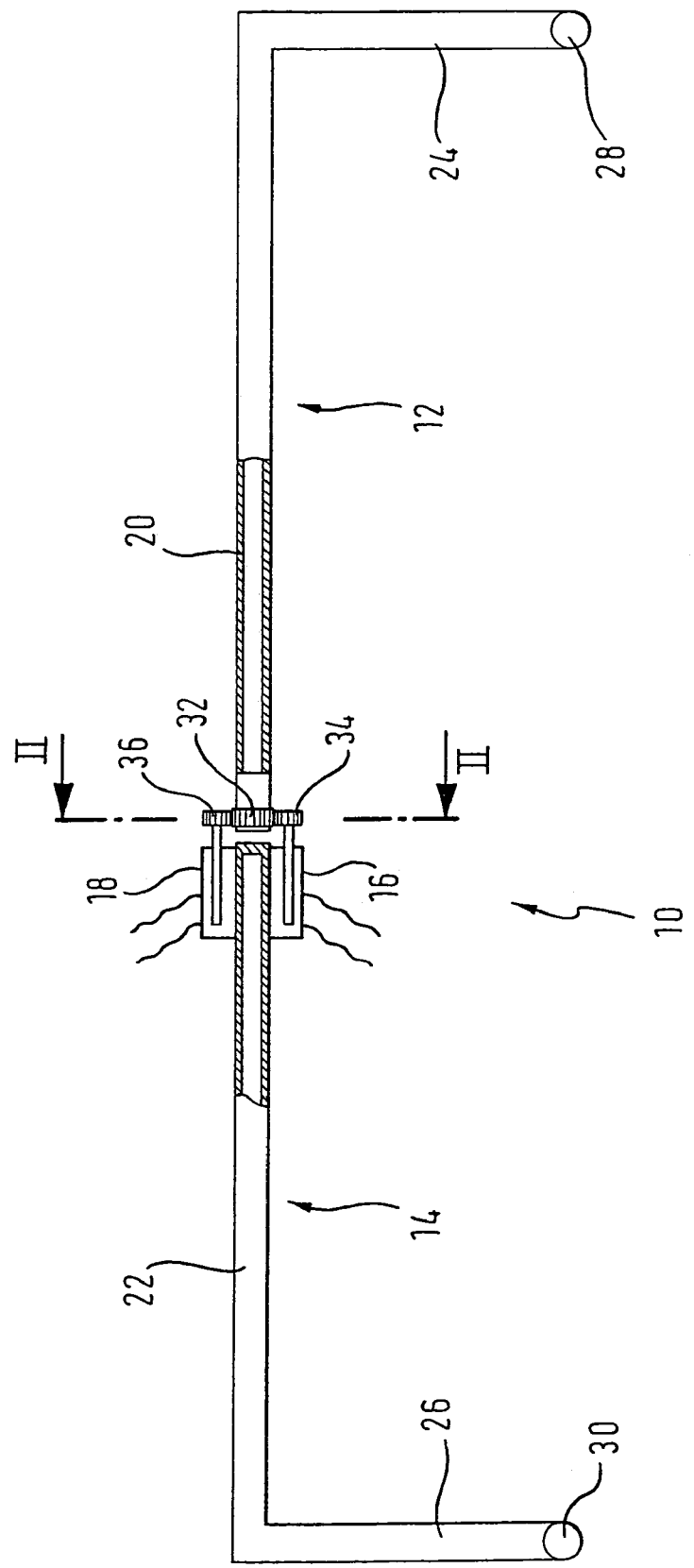
FIG. 1 shows a schematic view of a stabilizer assembly unit according to a first embodiment of the invention.

FIG. 1 shows a stabilizer assembly unit 10 in accordance with the invention, comprising a first stabilizer 12, a second stabilizer 14, a first rotary drive 16, and a second rotary drive 18. The two stabilizers 12 and 14 each comprise a torsion bar section 20 and 22, respectively, followed at right angles by a lever arm section 24 and 26, respectively. At the free end of each lever arm section 24 and 26, an articulation 28 and 30, respectively, can be provided, by means of which the stabilizer can engage a vehicle axle, for example the suspension arms or the wheel support. Advantageously, the stabilizers 12 and 14 are each mounted rotatably with their torsion bar sections 20 and 22, respectively, for example on the body or on the chassis of the vehicle. At the free end of its torsion bar section 20 the first stabilizer 12 is provided with a sun gearwheel 32.

The rotary drive 16 acts on a planetary gearwheel 34 and the rotary drive 18 acts on a planetary gearwheel 36, the two planetary gearwheels 34 and 36 meshing with the sun gearwheel 32. In the present embodiment the two planetary gearwheels 34 and 36 are each mounted directly on the driven shaft of the rotary drive 16 and 18, respectively, with each drive acting on its associated gearwheel. However, it is also possible to drive the planetary gearwheels 34 and 36 via, for example, a gear transmission. The drives are mounted non-rotatably at the free end of the torsion bar section 22 of the stabilizer 14. Here, the rotary drives 16 and 18 are mounted in such a manner that the planetary gearwheels 34 and 36 are arranged symmetrically relative to the axis of rotation of the sun gearwheel 32.

In the illustrated embodiment the rotary drives 16 and 18 are designed as electric motor drives. Therefore, they can be controlled by means of known methods over a large speed range or torque range. In this manner and given these drives, the torque and the response time of the assembly unit can advantageously be adapted to the vehicle parameters. It is, however, also conceivable to design the rotary drives as hydraulic drives or in another form.

Figure 2:
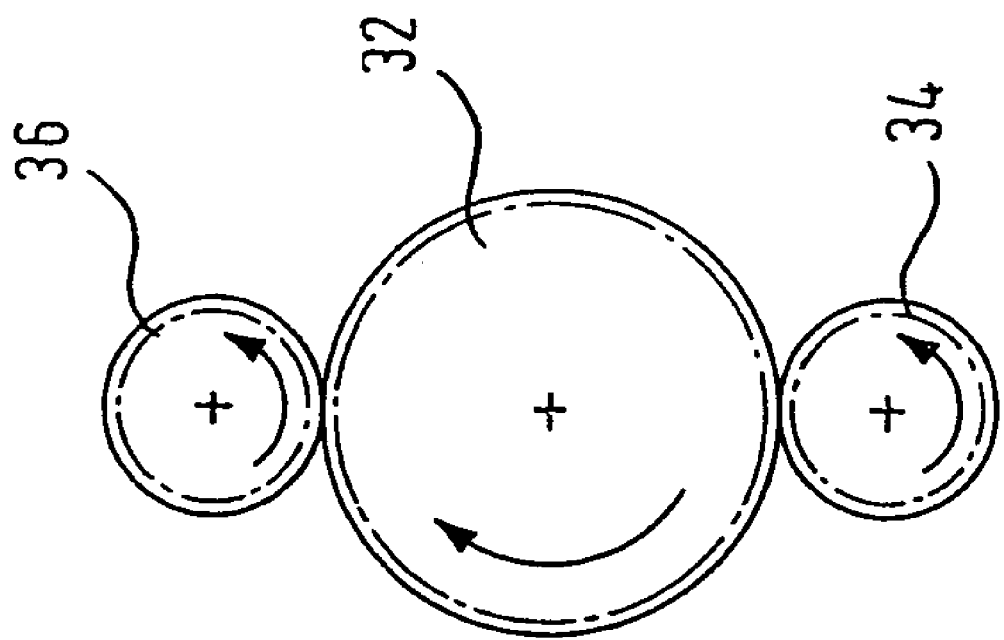
FIG. 2 shows a cross-section through the stabilizer assembly unit of FIG. 1 along the line II-II in FIG. 1.

As is indicated in FIG. 2 by the arrows drawn therein, the two rotary drives 16 and 18 are driven in the same direction so that the planetary wheels 34 and 36 together exert a torque on the sun gearwheel 32 and thus the two stabilizers 12 and 14 are rotated, i.e. tensioned, with respect to one another. As those skilled in the art sufficiently know, this allows to implement an active control of the chassis, for example for balancing a torque. By means of the symmetrical arrangement of two drives 16 and 18 it can be achieved without any further supplementary gearwheels that solely the torque acts on the sun gearwheel 32 and thus on the stabilizers 12 and 14. In case of an assembly unit having only one rotary drive or planetary gearwheels arranged non-symmetrically, lateral forces would act on the axes of the stabilizers, which would have to be taken up by the mountings of the stabilizers.

Figure 3:
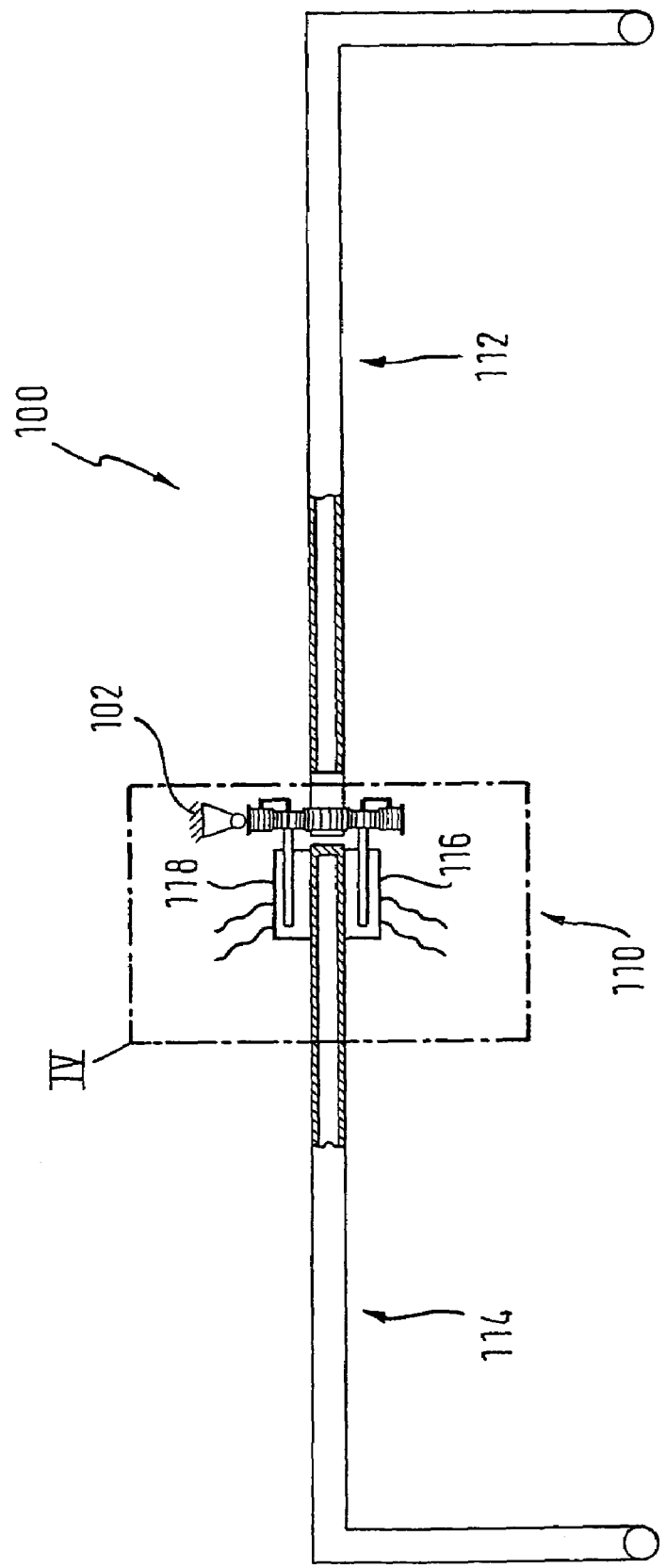
FIG. 3 shows a schematic view of a chassis assembly unit according to the invention.
Figure 4:
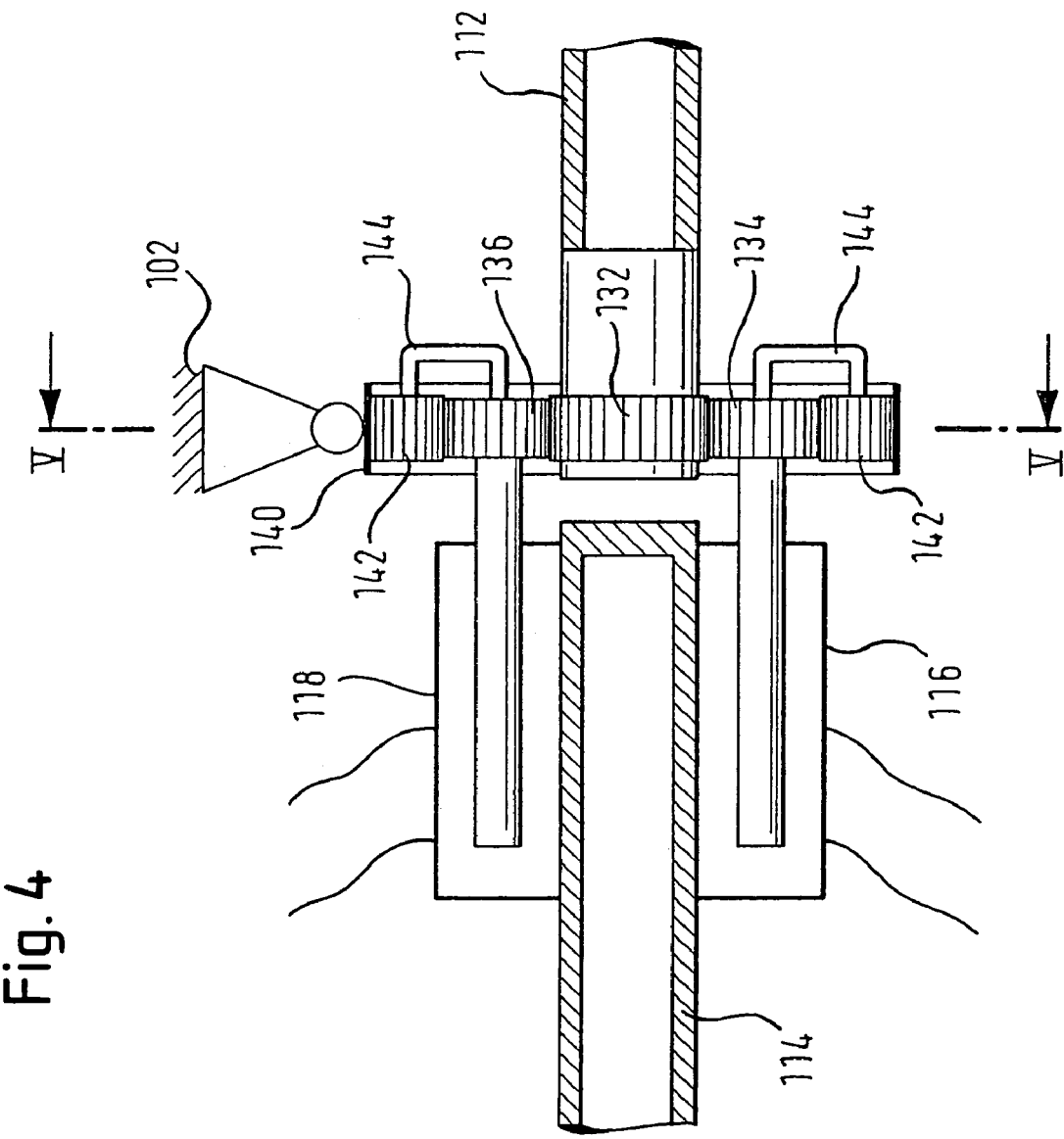
FIG. 4 shows an enlarged view of detail IV of FIG. 3.
Figure 5:
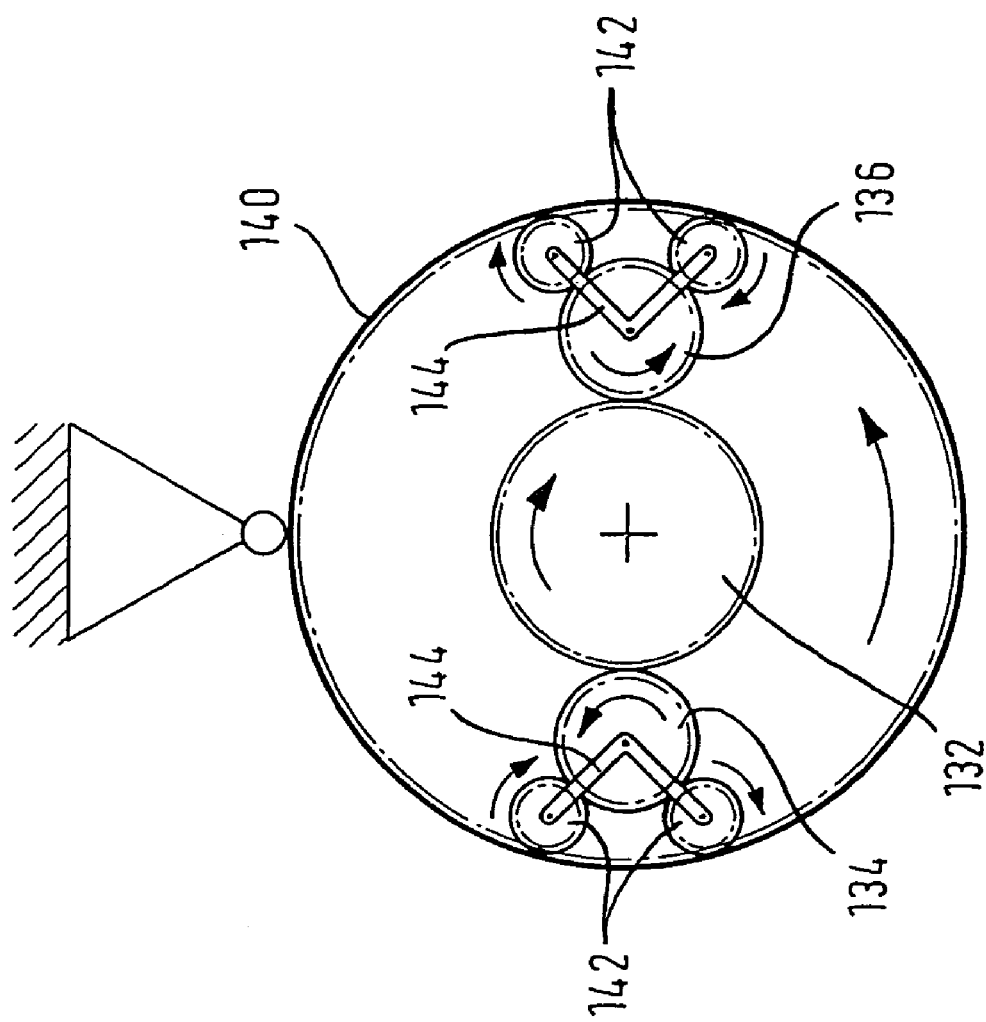
FIG. 5 shows a cross-section through the chassis assembly unit of FIG. 3 along the line V-V in FIG. 4.

In FIGS. 3 to 5 a chassis assembly unit 100 is illustrated, with reference numerals increased by 100 being used for components already known.

The chassis assembly unit 100 comprises a vehicle body 102 (indicated symbolically in FIG. 3) and a stabilizer assembly unit 110 according to a second embodiment of the invention. In this embodiment an internally geared wheel 140 is additionally provided, which, as is indicated in the Figures, is advantageously connected vehicle-fixed, for example to the vehicle body or the chassis. The internally geared wheel 140 meshes via auxiliary gearwheels 142 with the planetary gearwheels 134 and 136. For locating the auxiliary gearwheels 142, the centers thereof are connected to the centers of the planetary gearwheels 134 and 136, respectively, by means of retaining brackets 144. The connection of two auxiliary gearwheels 142 each to a planetary gearwheel 134, 136 renders a separate mounting ring for the auxiliary gearwheels 142 unnecessary. On account of the non-rotatable fastening of the internally geared wheel 140 there results, upon activation of the drives 116 and 118, a uniform distribution of the angle of rotation between the first stabilizer 112 and the second stabilizer 114. Thus, it is also achieved that both stabilizers are tensioned uniformly.

Figure 6:
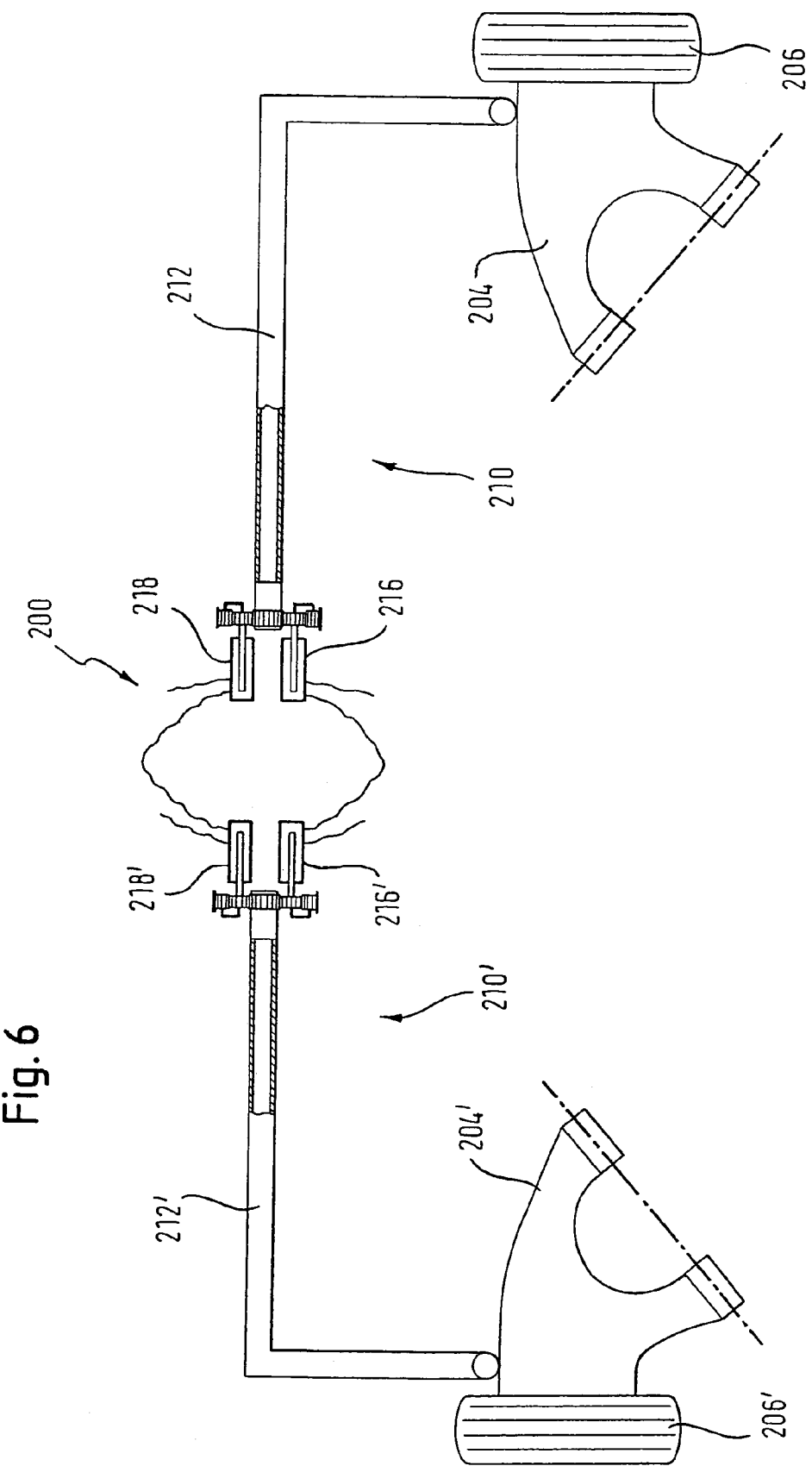
FIG. 6 shows a schematic view of a vehicle axle according to the invention.

Finally, FIG. 6 shows a vehicle axle 200 comprising two wheels 206, 206' suspended individually on wheel supports 204, 204'. For each of the wheel supports 204, 204' a separate stabilizer assembly unit 210, 210' is provided. Each of the stabilizer assembly units 210, 210' is provided with two drives 216, 218 and 216', 218' respectively, which, in contrast to the embodiments described before, are not connected to a second stabilizer but for example to the vehicle body in a non-rotatable manner. Thus, each wheel support 204, 204' of the vehicle axle 200 can be controlled independently. In this way the two stabilizers 212 and 212' cannot only be tensioned in an opposite direction but also in the same direction. In this manner it is possible to adjust advantageously not only rolling movements but also pitch movements of the vehicle.

The illustrated embodiments are, by way of example, equipped with two rotary drives. It is, however, also possible to use advantageously three or more rotary drives, to achieve, for example, a higher torque or to be able to use smaller motors.

In accordance with the provisions of other patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A stabilizer assembly unit comprising a first stabilizer, a sun gearwheel connected non-rotatably to one end of the stabilizer, and at least one rotary drive acting on a planetary gearwheel which meshes with the sun gearwheel.

2. The stabilizer assembly unit according to claim 1, wherein several rotary drives are provided, each acting on a planetary gearwheel, the planetary gearwheels being arranged symmetrically relative to the axis of the sun gearwheel.

3. The stabilizer assembly unit according to claim 1, wherein the rotary drives comprise electric motors.

4. The stabilizer assembly unit according to claim 1, wherein the rotary drives are connected non-rotatably to a second stabilizer.

5. The stabilizer assembly unit according to claim 1, wherein an internally geared wheel is provided, which meshes via at least one auxiliary gearwheel with the planetary gearwheels.

6. A vehicle axle comprising at least two wheels, characterized in that for each of the wheels a separate stabilizer assembly unit according to claim 1 is provided.

7. A chassis assembly unit for a vehicle comprising a body and a stabilizer assembly unit according to claim 5, wherein the internally geared wheel is connected non-rotatably to the vehicle body.

8. A vehicle axle comprising:
at least one wheel at each end of the axle; and
a respective stabilizer assembly unit associated with the at least one wheel of each end of the axle, the stabilizer assembly units each including
a stabilizer;
a sun gearwheel connected non-rotatably to one end of the stabilizer;
a planetary gearwheel which meshes with the sun gearwheel; and
at least one rotary drive acting on the planetary gearwheel.

* * * * *